(12) United States Patent
Li et al.

(10) Patent No.: US 10,491,525 B2
(45) Date of Patent: Nov. 26, 2019

(54) TRAFFIC ENGINEERING FEEDER FOR PACKET SWITCHED NETWORKS

(71) Applicant: HUAWEI TECHNOLOGIES CO., LTD., Shenzhen (CN)

(72) Inventors: Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/643,883

(22) Filed: Mar. 10, 2015

(65) Prior Publication Data

US 2016/0269298 A1 Sep. 15, 2016

(51) Int. Cl.
*H04L 12/801* (2013.01)
*H04L 12/715* (2013.01)

(52) U.S. Cl.
CPC .............. *H04L 47/18* (2013.01); *H04L 45/04* (2013.01); *H04L 45/64* (2013.01)

(58) Field of Classification Search
CPC .......... H04L 47/18; H04L 45/04; H04L 45/64
See application file for complete search history.

(56) References Cited

U.S. PATENT DOCUMENTS

| | | | | |
|---|---|---|---|---|
| 5,600,794 A * | 2/1997 | Callon | .................... | H04L 45/02 370/351 |
| 7,920,569 B1 * | 4/2011 | Kasturi | ................. | H04L 69/326 370/392 |
| 7,990,885 B2 * | 8/2011 | Rajan | ..................... | H04L 41/12 370/252 |
| 8,489,685 B2 * | 7/2013 | Bharadhwaj | .......... | G06Q 10/10 709/205 |

(Continued)

FOREIGN PATENT DOCUMENTS

| | | |
|---|---|---|
| CN | 1184787 C | 1/2005 |
| CN | 1738308 A | 2/2006 |

(Continued)

OTHER PUBLICATIONS

Guowa C., "Reliable Routing Protocol of Wireless Sensor Network in Event-driven Application", National University of Defense Technology, Apr. 2012, 2 pages.

*Primary Examiner* — Sulaiman Nooristany
(74) *Attorney, Agent, or Firm* — Slater Matsil, LLP (57) ABSTRACT

It is possible to implement traffic engineering policies in a packet switched network by dynamically configuring different transport protocols to be used over different path segments of an end-to-end path. Specifically, a controller may communicate forward information base (FIB) control signaling instructions to network nodes along an end-to-end path. The FIB signaling instructions may configure network nodes on different path segments of the end-to-end path to route a traffic flow using different path transport protocols. For example, the FIB signaling instructions may assign a link-based transport protocol to a first path segment, and a path-based or source-based transport protocol to a second path segment. Alternatively, the controller may indirectly assign transport protocols to regions/path segments by classifying regions of a packet switched network as link-preferred regions, path-preferred regions, or no-preference regions.

29 Claims, 4 Drawing Sheets

(56) References Cited

U.S. PATENT DOCUMENTS

| | | | |
|---|---|---|---|
| 8,559,324 B1* | 10/2013 | Brandwine | H04L 12/1432 370/252 |
| 8,649,304 B2* | 2/2014 | Kubsch | H04L 65/80 370/282 |
| 8,694,664 B2* | 4/2014 | Jain | H04L 45/24 370/465 |
| 9,419,920 B1* | 8/2016 | Rohrer | H04L 49/355 |
| 9,438,489 B2* | 9/2016 | Beyene | H04L 41/145 |
| 9,628,591 B2* | 4/2017 | Dharmavaram | H04L 69/326 |
| 9,660,912 B2* | 5/2017 | Gouache | H04L 47/10 |
| 9,798,503 B2* | 10/2017 | Zakharov | H04L 63/0227 |
| 9,813,465 B2* | 11/2017 | Petria | H04L 65/4069 |
| 2002/0032798 A1* | 3/2002 | Xu | H04L 29/06 709/238 |
| 2003/0103510 A1 | 6/2003 | Svanberg et al. | |
| 2003/0156541 A1* | 8/2003 | Haihong | H04L 45/50 370/235 |
| 2003/0172201 A1 | 9/2003 | Hatae et al. | |
| 2005/0036445 A1* | 2/2005 | Chien-Hsin | H04L 47/10 370/229 |
| 2006/0067247 A1* | 3/2006 | Rajan | H04L 41/12 370/254 |
| 2006/0075483 A1 | 4/2006 | Oberle et al. | |
| 2006/0233167 A1 | 10/2006 | McAllister et al. | |
| 2007/0005804 A1* | 1/2007 | Rideout | H04L 12/1822 709/246 |
| 2007/0064618 A1* | 3/2007 | Garcia | H04L 43/12 370/252 |
| 2007/0121559 A1* | 5/2007 | Xhafa | H04L 45/12 370/338 |
| 2007/0130478 A1 | 6/2007 | Langworthy et al. | |
| 2008/0002588 A1 | 1/2008 | McCaughan et al. | |
| 2008/0025516 A1* | 1/2008 | Masuhiro | H04L 63/0428 380/279 |
| 2008/0031239 A1 | 2/2008 | Kapoor et al. | |
| 2008/0037477 A1* | 2/2008 | Axelsson | H04L 45/02 370/338 |
| 2008/0062879 A1* | 3/2008 | Sivakumar | H04L 29/1249 370/235 |
| 2008/0075084 A1* | 3/2008 | Choi | H04L 45/00 370/392 |
| 2008/0186907 A1* | 8/2008 | Yagyuu | H04B 7/155 370/328 |
| 2009/0296740 A1 | 12/2009 | Wagh et al. | |
| 2010/0150155 A1 | 6/2010 | Napierala | |
| 2010/0183004 A1 | 7/2010 | Kobayashi | |
| 2010/0329248 A1* | 12/2010 | Eggert | H04L 67/1002 370/389 |
| 2011/0116380 A1* | 5/2011 | Sivakumar | H04L 47/10 370/236 |
| 2012/0213227 A1* | 8/2012 | Jaeger | H04L 45/026 370/392 |
| 2013/0064198 A1* | 3/2013 | Krishnaswamy | H04L 45/24 370/329 |
| 2013/0077501 A1* | 3/2013 | Krishnaswamy | H04L 47/193 370/252 |
| 2013/0195004 A1* | 8/2013 | Hampel | H04L 69/16 370/315 |
| 2013/0259035 A1 | 10/2013 | Chen et al. | |
| 2014/0143855 A1* | 5/2014 | Keoh | H04L 63/123 726/14 |
| 2014/0177638 A1* | 6/2014 | Bragg | H04L 45/50 370/395.5 |
| 2014/0269776 A1* | 9/2014 | Bomfim | H04N 21/64322 370/503 |
| 2014/0325081 A1* | 10/2014 | Heinrich | H04L 29/08792 709/228 |
| 2014/0330887 A1* | 11/2014 | Gilberton | H04L 47/196 709/202 |
| 2015/0026756 A1* | 1/2015 | Reddy | H04W 12/08 726/1 |
| 2015/0055654 A1 | 2/2015 | Song | |
| 2015/0207736 A1 | 7/2015 | Roch et al. | |
| 2015/0263959 A1* | 9/2015 | Patwardhan | H04L 47/193 370/235 |
| 2015/0381455 A1* | 12/2015 | Martinsen | H04L 65/608 370/252 |
| 2016/0057390 A1* | 2/2016 | Ramalho | H04N 7/155 348/14.08 |
| 2016/0078220 A1* | 3/2016 | Scharf | G06F 21/51 726/1 |
| 2016/0094690 A1* | 3/2016 | Dharmavaram | H04L 69/326 370/469 |
| 2016/0156514 A1* | 6/2016 | Salonidis | H04L 45/48 709/223 |
| 2017/0134472 A1* | 5/2017 | Ye | H04L 65/608 |

FOREIGN PATENT DOCUMENTS

| | | |
|---|---|---|
| CN | 101369960 A | 2/2009 |
| CN | 101594306 A | 12/2009 |
| CN | 103023773 A | 4/2013 |
| CN | 103166959 A | 6/2013 |
| CN | 103347013 A | 10/2013 |
| CN | 103428306 A | 12/2013 |
| EP | 1418716 A1 | 5/2004 |
| EP | 1643712 A1 | 4/2006 |
| JP | 2003531519 A | 10/2003 |
| WO | 2005119978 A1 | 12/2005 |

\* cited by examiner

TRAFFIC ENGINEERING FEEDER FOR PACKET SWITCHED NETWORKS

TECHNICAL FIELD

The present invention relates generally to software defined networks, and in particular embodiments, to traffic engineering feeders for packet switched networks.

BACKGROUND

Different packet transport networks use different schemes to route traffic over the data plane. For example, some packet transport networks use source routing protocols that allow a sender of a packet to partially or completely specify the pathway over which the packet is transported through the network. Other packet transport networks use non-source routing protocols to switch packets on a link-by-link basis such that en-route nodes are responsible for determining at least a portion of the pathway over which the packet is transported through the network. Different routing schemes may offer different advantages and disadvantages for different network scenarios. For example, source routing protocols may offer low complexity, while non-source routing protocols may provide better overall network performance.

SUMMARY OF THE INVENTION

Technical advantages are generally achieved by embodiments of this disclosure which describe traffic engineering feeders for packet switched networks.

In accordance with an embodiment, a method for operating a controller is provided. In this example, the method assigning a first transport protocol to a first path segment of an end-to-end path, and a second transport protocol to a second path segment of the end-to-end path. The first transport protocol is one of a source-based transport protocol, a path-based transport protocol, and a link-based transport protocol, and the second transport protocol is a different one of the source-based transport protocol, the path-based transport protocol, and the link-based transport protocol. The method further includes communicating at least one forward information base (FIB) control signaling instruction to at least one network node on the first path segment and at least one network node on the second path segment. The at least one FIB control signaling instruction identifying the transport protocol assignments. An apparatus for performing this method is also provided.

In accordance with another embodiment, another method for operating a controller is provided. In this example, the method comprises identifying regions in a packet switched network, and classifying the regions in accordance with characteristics associated with the regions. At least one of the regions is classified as a link-preferred region, and at least one of the regions is classified as a path-preferred region. The method further includes communicating region classifications to at least one network node within each of the regions. The region classifications instruct at least a first network node in the path-preferred region to forward data in accordance with a path-based transport protocol when network nodes in the path-preferred region are capable of performing path-based routing. The region classifications further instruct at least a second network node in the link-preferred region to forward data in accordance with a link-based transport protocol when network nodes in the link-preferred region are capable of performing path-based routing. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure provide techniques for dynamically configuring different transport protocols to be used over different path segments of an end-to-end path. Specifically, a controller may communicate forward information base (FIB) control signaling instructions to network nodes along an end-to-end path. The FIB signaling instructions may configure network nodes on different path segments of the end-to-end path to route a traffic flow using different path transport protocols. For example, the FIB signaling instructions may indicate that one of a source-based transport protocol, a path-based transport protocol, and a link-based transport protocol has been assigned to one path segment, and that a different one of the source-based transport protocol, the path-based transport protocol, and the link-based transport protocol has been assigned to the another path segment. Assigning the link-based transport protocol to a path segment instructs network nodes along that path segment to dynamically select next-hops of a pathway traversing the path segment on a node-by-node basis, e.g., each downstream node selects the corresponding next-hop on the pathway. Assigning a path-based transport protocol to a path segment instructs network nodes on the path segment to forward a packet over a pathway based on a path identifier carried in a header of the packet. Assigning a source-based transport protocol to a path segment instructs network nodes on the path segment to forward a packet over a pathway based on a list of next-hop identifiers carried in a header of the packet. A pathway traversing a path segment may be pre-configured by the controller when the path-based transport protocol or the source-based transport protocol is assigned to the path-segment. The ingress node of the path segment may append a path identifier to the packet when using the path-based transport protocol. The ingress node of the path segment may append a list of next-hop addresses (e.g., a multiprotocol label switching (MPLS) label) to the packet when using the source-based transport protocol.

The controller may directly assign transport protocols to path segments based on capabilities of the network nodes along the path segments. For example, the controller may assign a link-based transport protocol to path segments having network nodes that are capable of link-based routing. The controller may assign a path-based transport protocol to path segments having network nodes capable of path-based routing but incapable of link-based routing. The controller may assign a source-based transport protocol to path segments having network nodes that are incapable of both link-based routing and path-based routing. A node's capability to perform link, path, and source-based routing may correspond to various different characteristics, such as the FIB storage capacity of the node or the topological knowledge of the node. The controller may also assign transport protocols to path segments based on characteristics of the regions/domains traversed by the path segments, e.g., control-plane signaling capacities and data-plane overhead capacities.

The controller may also indirectly assign transport protocols to regions or path segments by classifying regions of a packet switched network as link-preferred regions, path-preferred regions, or no-preference regions. The controller may then communicate the region classifications to the network nodes of the respective regions, and the network nodes may dynamically select transport protocols based on both the transport preferences and various supplemental selection criteria, such as the network node's own capabilities and traffic flow characteristics, e.g., traffic flow stability. These and other aspects are discussed in greater detail below.

As used herein, the term "end-to-end path" refers to any path between a source node and a destination node. Stated differently, the term "end-to-end path" does not imply that individual links between the destination and source nodes have been defined. For example, during link-based routing, nodes along the end-to-end path dynamically select the next hop. The source node and/or the destination node may be points from which a traffic flow is generated and/or terminated, e.g., an application server, a content source, a content distribution node, and an end-user. Alternatively, the source node and/or the destination node may be intermediate points (e.g., network gateways) between the origination and termination points of the traffic flow. For example, a source node may be an ingress gateway from which a traffic flow enters an intermediate network (e.g., a wide area network (WAN) between source and destination local area networks (LANs)), and the destination node may be an egress gateway from which the traffic flow exits the intermediate network.

The term "path segment" refers to any sub-portion of an end-to-end path positioned between an upstream node (e.g., an ingress network node) and a downstream node (e.g., egress network node). The term pathway refers to a specific set of interconnecting links extending between the upstream node of a path segment and the downstream node of the path segment. Hence, a "path segment" may have multiple potential "pathways" in so far as there are alternative routes (e.g., sets of links) between the upstream and downstream nodes of the path segment. By way of example, a path segment extending from the ingress network node 111 to the egress network node 119 (in FIG. 1) has multiple potential pathways, including: (i) potential pathway extending through intermediate network nodes 113, 115; (ii) potential pathway extending through intermediate network nodes 113, 116; (iii) potential pathway extending through intermediate network nodes 114, 116; and (iv) potential pathway extending through intermediate network nodes 114, 117. Other indirect pathways may also exist, e.g., potential pathway extending through intermediate network nodes 114, 116, 113, 115. In some implementations, each path segment of an end-to-end path may traverse a different network domain. In other implementations, a single network domain may include multiple path segments, e.g., path segments end/begin at intermediate network nodes. As used herein, the term "source-based routing" refers to a routing protocol in which packets are switched over a pre-defined path (e.g., a path defined by a controller) associated with a list of next-hop addresses carried in the header of the packet. As used herein, the term "path-based routing" refers to a routing protocol in which packets are switched over a pre-defined path (e.g., a path defined by a controller) associated with a path identified carried in the header of the packet. During path-based routing, network nodes along the predefined path may identify the next-hop/link by searching a routing table (e.g., forwarding information base (FIB) table) to identify which next-hop address is associated with the path ID. Path-based routing may reduce packet overhead when compared to source-based routing. As used herein, the term "link-based routing" refers to a routing protocol in which next-hops are dynamically selected by network nodes on a node-by-node basis.

Figure 1:
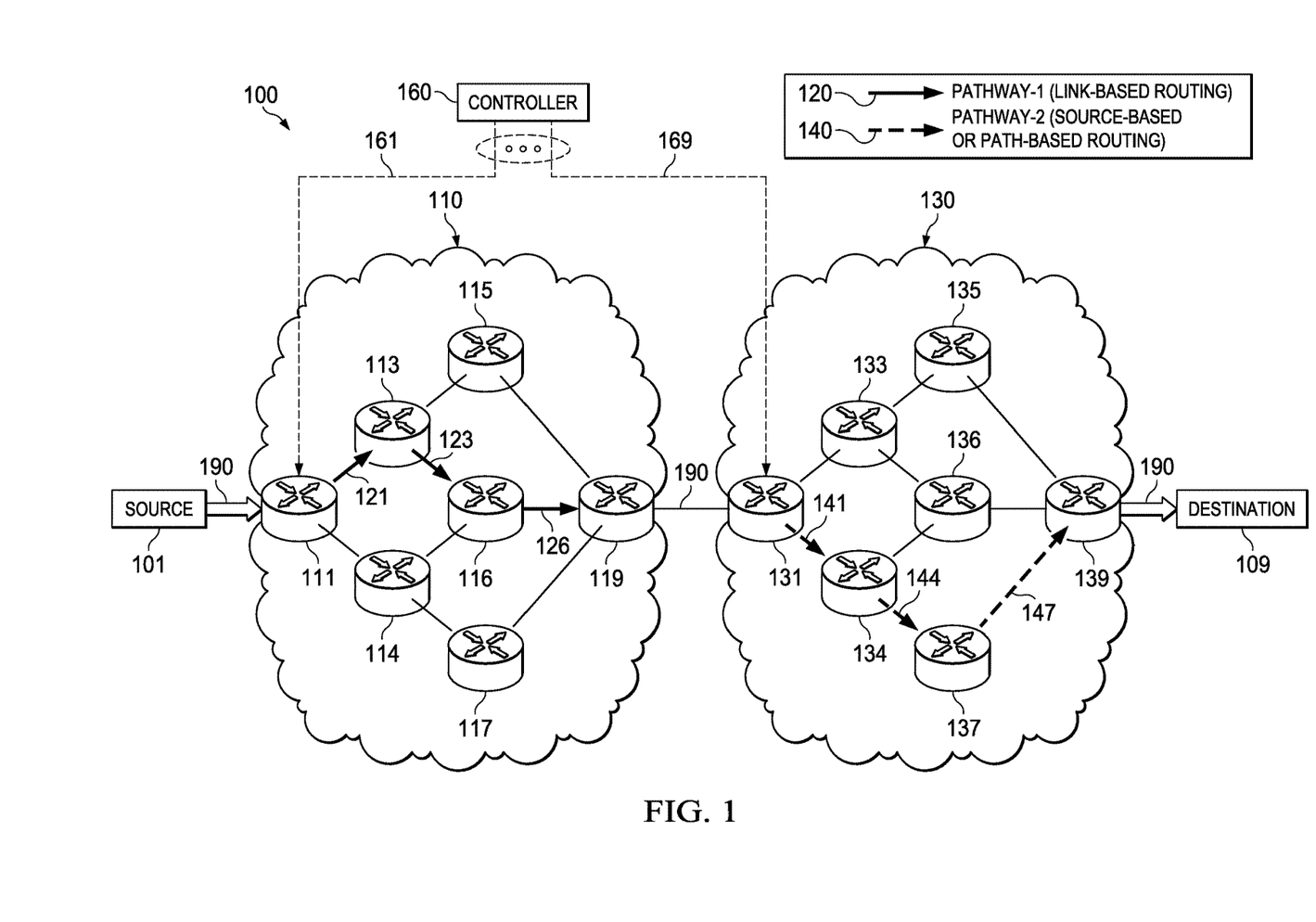
FIG. 1 illustrates a diagram of an embodiment software defined network (SDN) network architecture for dynamically configuring transport protocols on path segments of an end-to-end path.

FIG. 1 illustrate a software defined network (SDN) architecture 100 for dynamically configuring transport protocols on path segments of an end-to-end path extending from a source 101 to a destination 109. As shown, the SDN network architecture 100 includes network domains 110, 130 and a controller 160. The network domain 110 includes an ingress network node 111, a plurality of intermediate network nodes 113-117, and an egress network node 119, while the network domain 130 includes an ingress network node 131, a plurality of intermediate network nodes 133-137, and an egress network node 139. The controller 160 may be any type of control-plane entity, e.g., traffic engineering (TE) controller, software defined networking (SDN) controller. In one embodiment, the controller 160 includes a traffic engineering (TE) feeder that acts as an interface with the data plane of the SDN network architecture 100.

The controller 160 may send signaling instructions 161-169 to nodes in the network domains 110, 130. The signaling instructions 161-169 may have a variety of different formats. For example, the signaling instructions 161-169 may include a forward information base (FIB) signaling instruction, or any other type of control signaling instruction. The signaling instructions 161-169 may be communicated to all (or a subset) of the networks nodes in the network domains 110, 130. For example, the signaling instructions 161-169 may be communicated exclusively to the ingress network nodes 111, 131 of the network domains 110, 130. As another example, the signaling instructions 161-169 may be communicated exclusively to edge nodes (e.g., the ingress nodes 111, 131, and the egress nodes 119, 139) of the network domains 110, 130. As yet another example, the signaling instructions 161-169 may be communicated to at least a subset of the intermediate nodes 113-117, 133-137 in the network domains 110, 130.

In one embodiment, the signaling instructions 161-169 assign transport protocols for routing traffic over path segments of the end-to-end path. For example, the signaling instructions 161-169 may assign a link-based transport protocol, a path-based transport protocol, or a source-based transport protocol for routing traffic over the respective path segments. In another embodiment, the signaling instructions 161-169 include transport protocol classifications for regions of the SDN network architecture 100. Regions may correspond to the network domains 110, 130, or to sub-portions thereof, e.g., one network domain may include two or more regions. A region may include one network node or multiple network nodes. In some embodiments, a region may include portions of multiple domains.

In this example, the signaling instructions 161-169 assign a link-based transport protocol to the network domain 110, and either a path-based or source-based transport protocol to the network domain 130. While this example illustrates a link-based protocol being assigned to a first domain and a path-based or source-based transport protocol being assigned to a subsequent domain, those of ordinary skill in the art will appreciate that the protocols can be assigned in any combination as well as in any order. For example, a path-based transport protocol could be assigned to a first domain, a source-based transport protocol could be assigned to an intermediate domain, and a link-based protocol could be assigned to a final domain. Moreover, those of ordinary skill should appreciate that a controller may assign different protocols to any number of regions (three regions, four regions, etc.) along an end-to-end path. A traffic flow 190 is received at the ingress network node 111. The traffic flow 190 is forwarded over the pathway 120 in accordance with the link-based transport protocol. In this example, the ingress network node 111 selects the network node 113 as the next-hop along the pathway 120, and forwards the traffic flow 190 over the link 121. The network node 113 selects the network node 116 as the next-hop along the pathway 120, and forwards the traffic flow 190 over the link 123. The network node 116 selects the egress network node 119 as the next-hop along the pathway 120, and forwards the traffic flow 190 over the link 126.

The traffic flow 190 is then forwarded from the egress network node 119 of the network domain 110 to the ingress network node 131 of the network domain 130 in accordance with an appropriate protocol. The traffic flow 190 is then routed over the network domain 130 in accordance with the path-based or source-based transport protocol. Specifically, the ingress network node 131 is notified that the traffic flow has been assigned to the pathway 140, which includes a set of links 141, 144, 147. The links 141, 144, 147 forming the pathway 140 may be dynamically selected by the controller 160 during link-based and path-based routing. The ingress network node 131 then attaches path information to packets of the traffic flow 190, and proceeds to forward the packets over the pathway 140. If the signaling instructions 161-169 assign a path-based transport protocol to the network domain 130, then the ingress network node 131 attaches a path identifier to the packets prior to forwarding the packets over the link 141. The path identifier is associated with next-hop information stored in FIB tables of the network nodes 134, 137, and is used by the network nodes 134, 137 to determine the appropriate next-hop along the pathway 140. While the egress network node 119 of the network domain 110 is depicted as being separate from the ingress network node 131 of the network domain 130, those of ordinary skill in the art will appreciate that an egress node of one domain (or region) may also be an ingress node of another domain (or region).

If the signaling instructions 161-169 assign a source-based transport protocol to the network domain 130, then the ingress network node 131 attaches a list of next-hop addresses to the packets prior to forwarding the packets over the link 141 of the pathway 140. The list of next-hop addresses may be a multiprotocol label switching (MPLS) header, or any other header information for identifying next-hops along the pathway 140. The list of next-hop addresses allows the network nodes 134, 137 to forward the packets to the appropriate next-hop without referencing FIB tables. Source-based transport protocols allow pathways to be created without populating FIB tables in the intermediate network nodes, and may be advantageous in regions having large numbers of nodes and/or control planes having low capacities or high latencies. Conversely, path-based transport protocols reduce the data plane overhead, and therefore may provide for more efficient data plane communications in some networks.

Figure 2:
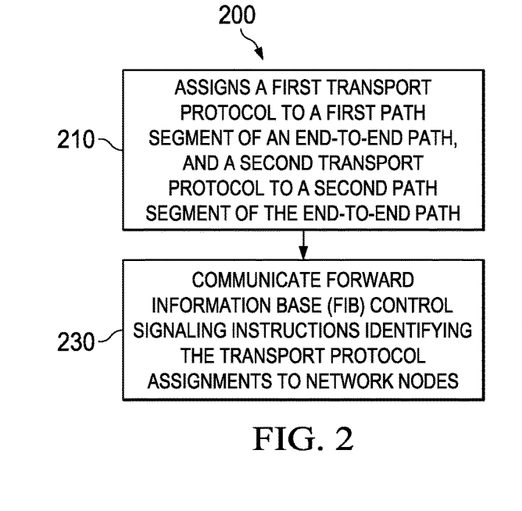
FIG. 2 illustrates a flowchart of an embodiment method for dynamically configuring transport protocols on path segments of an end-to-end path.

Aspects of this disclosure provide methods for dynamically configuring transport protocols in packet switched network domains. FIG. 2 illustrates an embodiment method 200 for dynamically configuring transport protocols on path segments of an end-to-end path, as might be performed by a controller. At step 210, the controller assigns a first transport protocol to a first path segment of an end-to-end path, and a second transport protocol to a second path segment of the end-to-end path. The first and second transport protocols include different ones of a source-based transport protocol, a path-based transport protocol, and a link-based transport protocol. The controller may assign transport protocols based on various criteria, e.g., node capabilities, FIB storage capacities, control signaling latencies, data plane overhead capacities. At step 220, the controller communicates at least one forward information base (FIB) control signaling instruction to at least one network node on the first path segment and at least one network node on the second path segment. The FIB control signaling instructions identify the transport protocol assignments. In an embodiment, the This FIB control signaling instructions prompt the network nodes to route data over the path segments in accordance with the assigned transport protocol.

As discussed above, the controller may assign transport protocols based on various criteria. In one embodiment, the controller assigns transport protocols based on FIB storage capacities of network nodes on the respective path segments. For example, the controller may assign a path-based transport protocol to a path segment when an FIB storage capacity of corresponding network nodes exceeds a storage threshold. On the other hand, the controller may assign either a link-based transport protocol or a source-based transport protocol to a path segment when an FIB storage capacity of the corresponding network nodes fails to exceed the storage threshold.

In another embodiment, the controller assigns transport protocols based on control plane signaling capabilities (e.g., signaling latency, signaling capacity) of network domains (or regions) traversed by the respective path segments. For example, the controller may assign a link-based transport protocol to a path segment when a control plane signaling capacity of network domain(s) of the corresponding path segment exceeds an upper threshold. as link-based transport protocols may require FIB signaling instructions be sent to each node associated with the path segment. The controller may assign a source-based transport protocol to the path segment when the control plane signaling capacity of network domain(s) of the corresponding path segment exceeds a lower threshold, but fails to exceed the upper threshold, as source-based transport protocols may require a relatively heavy FIB signaling instruction (e.g., signaling instruction carrying a list of next-hop addresses) to be sent to the ingress node of the path segment. The controller may assign a path-based transport protocol to the path segment when the control plane signaling capacity of network domain(s) of the corresponding path segment fails to exceed the lower threshold, as path-based transport protocols may require that a relatively light FIB signaling instruction (e.g., signaling instruction carrying a path identifier) be sent to the ingress node of the path segment.

In yet another embodiment, the controller assigns transport protocols based on data plane overhead capacities of network domains traversed by the respective path segments. For instance, source-based transport protocols may carry a list of next-hop addresses in a packet header, and therefore may require higher packet overhead capacities than link-based and path-based transport protocols carrying a path identifier and a single next-hop address. In one example, the controller may assign a source-based transport protocol to a path segment when a data plane overhead capacity of network domain(s) of the corresponding path segment exceeds a threshold. The controller may assign a either a path-based transport protocol or a link-based transport protocol to the path segment when the data plane overhead capacity fails to exceed the threshold.

In some embodiments, a controller may assign transport protocol preferences to different regions/domains. For example, a controller may classify a region as a path-preferred region, a link-preferred region, or a no-preference region. In some embodiments, source-based routing is used as a fall back in situations where nodes are in-capable of path-based routing. The region classifications may then be communicated to network nodes within the regions to prompt the network nodes to select transport protocols based on both the preference classification and the network node's routing capacities.

Figure 3:
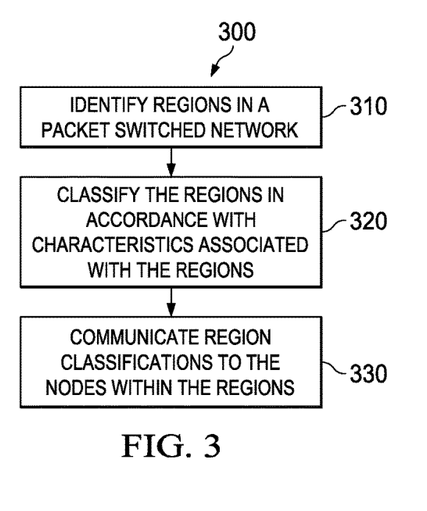
FIG. 3 illustrates a flowchart of an embodiment method for dynamically configuring transport protocols based on region classifications in a packet switched network.

FIG. 3 illustrates an embodiment method 300 for dynamically configuring transport protocols based on region classifications in a packet switched network, as might be performed by a controller. At step 310, the controller identifies regions in a packet switched network. At step 320, the controller classifies the regions in accordance with characteristics associated with the regions. In an embodiment, a controller may classify regions based on topological stability (e.g., how often the topology changes) and/or control signaling latencies (e.g., delays associated with control signaling). For example, the controller may classify a region as link preferred when topological updates to the corresponding region exceed a threshold rate of recurrence. Further, the controller may classify a region as a path-preferred region when control-plane delays in the corresponding region exceed a latency threshold. The controller may classify regions that do not satisfy either of those two criteria as no-preference regions. At step 330, the controller communicates the region classifications to at least one network node within each of the respective regions. The region classifications may instruct at least one network node in the path-preferred region to forward data in accordance with the path-based transport protocol when network nodes in the path-preferred region are capable of performing path-based routing. The region classifications may further instruct at least one network node in the link-preferred region to forward data in accordance with the link-based transport protocol when network nodes in the link-preferred region are capable of performing path-based routing.

In some implementations, region classifications may be used to allocate transport protocols along an end-to-end path. Table 1 indicates an embodiment configuration for selecting transport protocols based on both the preference classification and the network node's routing capabilities. The term "routing capabilities" refers to any ability or characteristic of a network node that allows, or prevents, the network node from performing a routing function. For example, routing capabilities in an SDN environment may refer to an FIB storage capacity of a network node or a processing capability of a network node. As another example, routing capabilities in a non-SDN environment may refer to the amount of topological knowledge available to the network node. For instance, some link-based transport protocols (e.g., position-based routing) may require a network node to know the position information of the destination node as well as neighboring nodes when making a routing decision. Other link-based transport protocols (e.g., distance-vector routing) may require a network node to know the graph distance to the destination when making a routing decision. In table 1, the region classifications may be based on the topological stability and signaling delay of a given region, while the node capabilities may be based on a storage capacity of the node. Configuration tables may be populated differently when different criteria are used for assigning region classifications and/or node capabilities.

TABLE 1

| Capability | Classification | | |
| --- | --- | --- | --- |
| | PATH-preferred | LINK-preferred | NO-preference |
| PATH-capable | PATH-based | LINK-based | PATH-based |
| LINK-capable | SOURCE-based | LINK-based | LINK-based or SOURCE-based |
| SOURCE-capable | SOURCE-based | SOURCE-based | SOURCE-based |

As shown, path-preferred regions having path-capable nodes may use path-based routing, while path-preferred regions having link-capable or source-capable nodes may use source-based routing. Link-preferred regions having path-capable and link-capable nodes may use link-based routing, while link-preferred regions having source-capable nodes may implement source-based routing. No-preference regions having path-capable nodes may use path-based routing, while no-preference regions having source-capable nodes may use source-based routing. No-preference regions having link-capable nodes may use either link-based or source-based routing. In an embodiment, link-capable nodes in a no-preference region will use link-based routing when a traffic flow is stable, and source-based routing when the traffic flow is unstable. A traffic flow may be considered stable when a rate variation of the traffic flow is below a threshold. Source-capable nodes may use source-based routing in all regions. Generally speaking, from an FIB capacity/storage perspective, link-capable nodes may lack the capacity to perform path-based routing, while source-capable nodes may lack the capacity to perform path-based and link-based routing. When capability is defined by a different criteria, the ordering of capabilities (e.g., path-capable, link-capable, source-capable) may change.

There may be supplemental policies for selecting transport protocols based on region classification, in addition to those set-forth in Table 1. For example, if a path-based or link-based region is followed by a source-based region, then the last node of the path-based or link-based region moves into the source-based region and becomes the ingress node of the source-based region. As another example, a source-capable node may be separated as a single-node link-based segment if it is situated in a source-based segment, as the ingress or first node in a source-based segment may need to be either path-capable or link-capable to build a routing header for the segment.

In some embodiments, the controller may comprise a traffic engineering (TE) feeder of a packet switched network. The TE feeder may provide a variety of different control plane mechanisms, such as segmenting flow paths, dynamically assigning transport protocols for path segments (on a flow-by-flow basis or otherwise), and compiling and distributing FIB update signals to network nodes. The TE feeder may be a logical component that is physically distributed at different network locations (e.g., domains, nodes). The TE feeder may act as a TE interface between the control plane and the data plane.

Embodiment TE feeders may configure transport protocols using various information, such as temporal or spatial traffic statistics (e.g., mean rate, rate variance, time duration per flow type per node), network physical topology information (e.g., node location, links, link properties), network virtual topology information (e.g., participating nodes, virtual links, virtual node properties including roles and functionalities, virtual link properties including capacity and delay, network hierarchies), network parameters relating to the configuration of nodes and links (e.g., storage capacities, link capacities), network statistics (e.g., average storage capacity per node, average control/signaling delay per link/path, average capacity per link), and traffic engineering decisions (e.g., flow identifiers, flow splitting information per-path and/or per-link).

Figure 4:
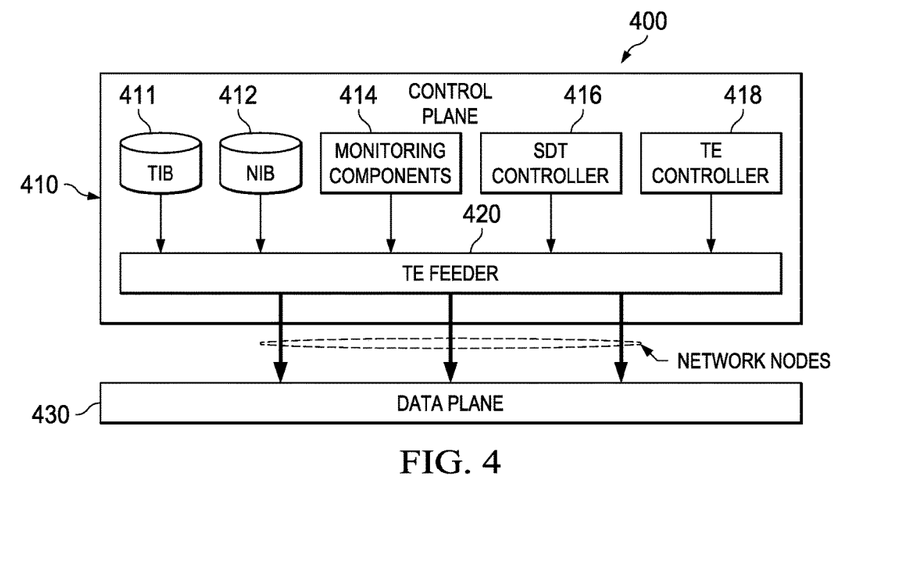
FIG. 4 illustrates a diagram of an embodiment traffic engineering feeder architecture for dynamically configuring transport protocols in a packet switched network.

FIG. 4 illustrates an embodiment TE feeder architecture 400 for configuring transport protocols in a packet switched network. As shown, the TE feeder architecture 400 includes a TE feeder 420 that acts as an interface between a control plane 410 and a data plane 430. The TE feeder 420 has access to a traffic information base (TIB) repository 411 for storing traffic statistics, and a network information base (NIB) repository 412 for storing information relating to network topologies, network parameters, and network statistics. The TE feeder 420 also has access to monitoring components 414 that monitor the TIB repository 411 and the NIB repository 412. In an embodiment, the monitoring components 414 may alert the TE feeder 420 when a parameter or value in the TIB repository 411 and/or the NIB repository 412 satisfies one or more alert criteria, e.g., major topology change, significant fluctuation in traffic load The TE feeder 420 also has access to an SDT controller 416, which may alert the TE feeder 420 of a significant change in the virtual topology of the packet switched network. The TE feeder 420 also has access to a TE controller 416, which may notify the TE feeder 420 of TE input decisions. Upon being alerted by the monitoring components 414 and/or the SDT controller 416, the TE feeder 420 may modify transport protocol assignments/classifications based on information in the TIB repository 411 and/or the NIB repository 412. Upon receiving a TE decision from the TE controller 418, the TE feeder 420 may segment flow paths according to transport assignments/classifications, as well as compile and distribute FIB update signals based on the segmentation.

Figure 5:
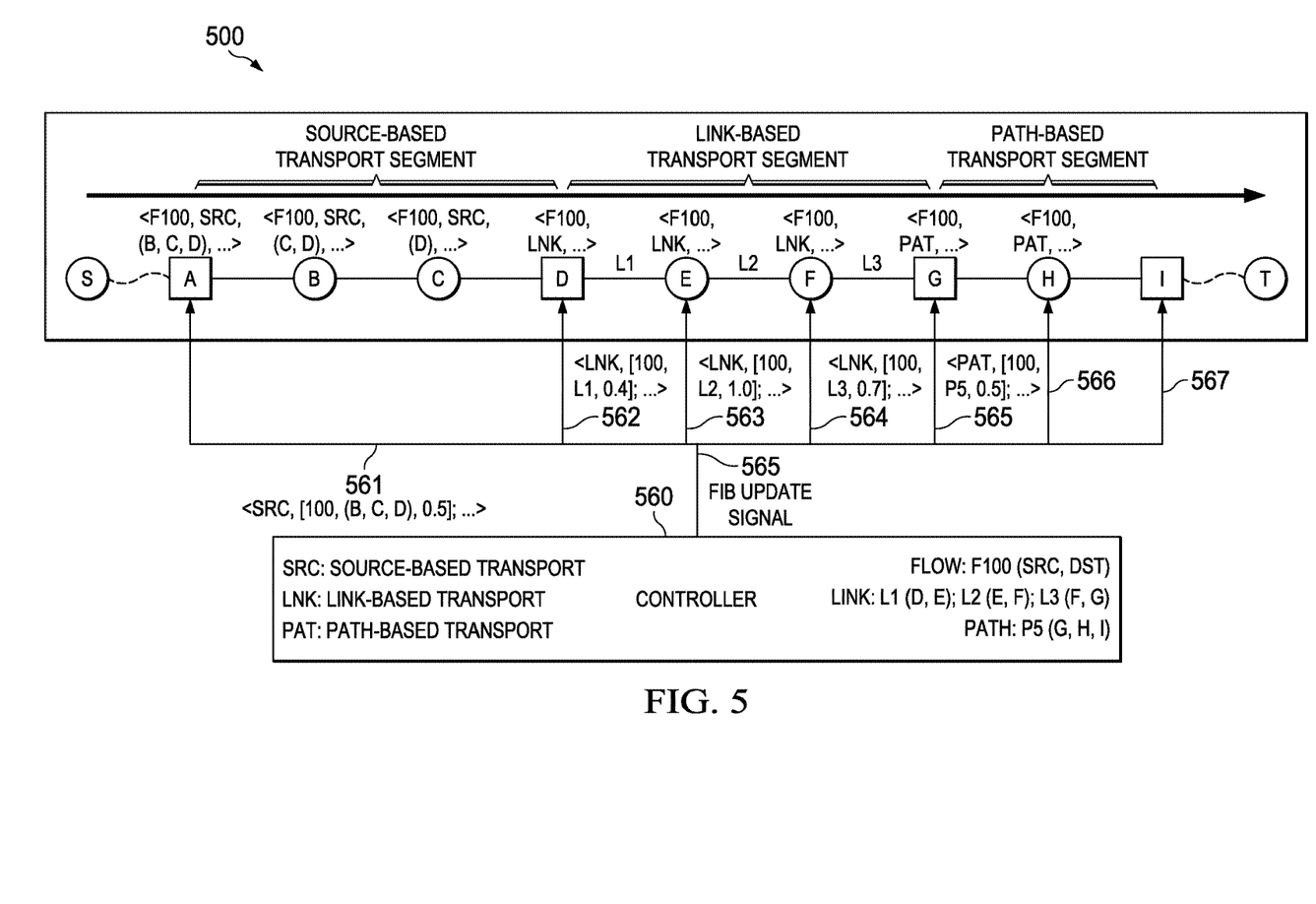
FIG. 5 illustrates a diagram of embodiment network architecture for configuring different transport protocols nodes over different path segments of an end-to-end path.

Aspects of this disclosure allow different transport protocols to be configured for different segments of an end-to-end path. FIG. 5 illustrates an embodiment network architecture 500 for configuring different nodes on an end-to-end path to use different transport protocols through SDN signaling. In this example, an SDN controller 560 dynamically configure TE policies by sending control signals 561-567 to en-route nodes A, D, E, F, and G. The control signal 561 indicates that source-based routing is to be used over a path segment extending from en-route node A to en-route node D. The control signals 562-564 indicate that link-based routing is to be used over a path segment extending from en-route node D to en-route node F. The control signals 565-567 indicate that path-based routing is to be used over a path segment extending from en-route node G to en-route node I. One or more of the control signals 561-567 may further include instruct the en-route nodes to update their FIB tables. For example, the control signals 562-564 may indicate parameters to be used when performing dynamic link selection (e.g., criteria for which link to select), while the control signals 565-567 may indicate path IDs and/or next-hop associations.

Figure 6:
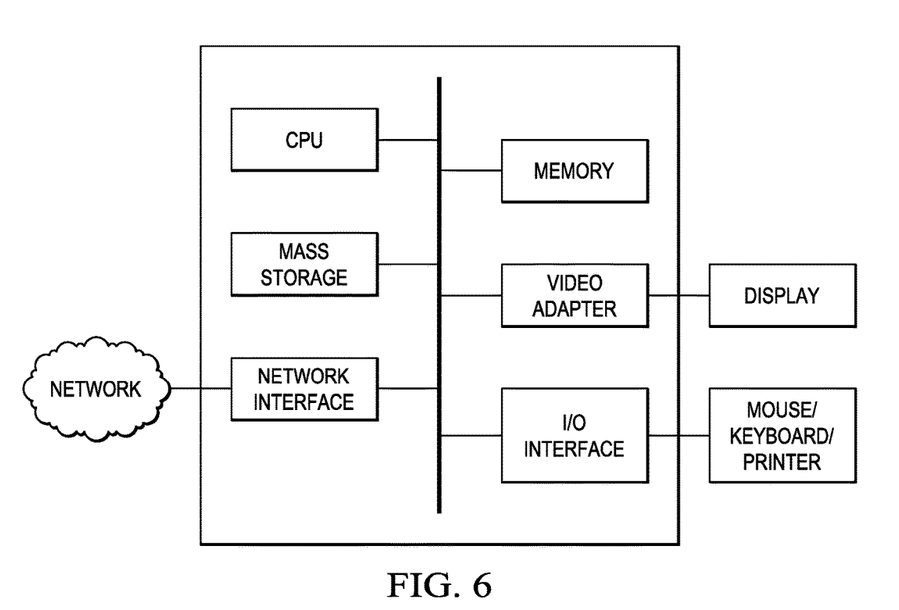
FIG. 6 illustrates a diagram of an embodiment computing platform.

FIG. 6 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 7:
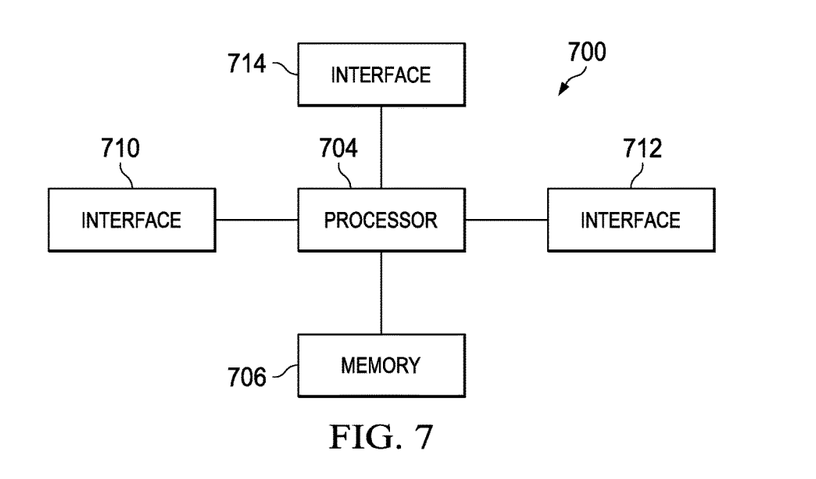
FIG. 7 illustrates a diagram of an embodiment communications device.

FIG. 7 illustrates a block diagram of an embodiment of a communications device 700, which may be equivalent to one or more devices (e.g., UEs, NBs) discussed above. The communications device 700 may include a processor 704, a memory 706, and a plurality of interfaces 710, 712, 714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710 may be any component or collection of components that allows the communications device 700 to communicate with other devices.

Although the embodiments have been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
    assigning, by a controller, both a source-based transport protocol to a first path segment of an end-to-end path and a path-based transport protocol to a second path segment of the end-to-end path according to at least a frequency of topological updates to regions traversed by the first path segment and the second path segment, the end-to-end path pre-configured in accordance with the source-based transport protocol and the path-based transport protocol; and
    communicating, by the controller, at least one forward information base (FIB) control signaling instruction to at least one network node on the first path segment and at least one network node on the second path segment, the at least one FIB control signaling instruction instructing the at least one network node on the first path segment to forward a packet over the first path segment according to the source-based transport protocol and instructing the at least one network node on the second path segment to forward the packet over the second path segment according to the path-based transport protocol, wherein the source-based transport protocol requires that the packet is forwarded over the first path segment according to a list of next-hop addresses in a header of the packet, and wherein the path-based transport protocol requires that the packet is forwarded over the second path segment according to a path identifier in the header of the packet.

2. The method of claim 1, wherein the list of next-hop addresses define a first pathway spanning the first path segment, and wherein the path identifier is associated with a second pathway spanning the second path segment.

3. The method of claim 2, wherein the first pathway and the second pathway are pre-configured by the controller.

4. The method of claim 2, wherein the at least one FIB control signaling instruction instructs a first ingress network node on the first pathway to append the list of next-hop addresses to the packet, and wherein the at least one FIB control signaling instruction instructs a second ingress network node on the second pathway to append the path identifier to the packet.

5. A method comprising:
    assigning, by a controller, both a source-based transport protocol to a first path segment of an end-to-end path and a link-based transport protocol to a second path segment of the end-to-end path according to at least a frequency of topological updates to regions traversed by the first path segment and the second path segment, at least part of the end-to-end path pre-configured in accordance with the source-based transport protocol; and
    communicating, by the controller, at least one forward information base (FIB) control signaling instruction to at least one network node on the first path segment and at least one network node on the second path segment, the at least one FIB control signaling instruction instructing the at least one network node on the first path segment to forward a packet over the first path segment according to the source-based transport protocol and instructing the at least one network node on the second path segment to forward the packet over the second path segment according to the link-based transport protocol, wherein the source-based transport protocol requires that the packet is forwarded over the first path segment according to a list of next-hop addresses in a header of the packet, and wherein the link-based transport protocol requires that the at least one network node on the second path segment dynamically select next-hops on a node-by-node basis when forwarding the packet over the second path segment.

6. The method of claim 5, wherein the list of next-hop addresses define a first pathway spanning the first path segment, and wherein each next-hop along a second pathway spanning the second path segment is dynamically selected by a preceding node on the second pathway.

7. The method of claim 6, wherein the first pathway is pre-configured by the controller, and wherein the second pathway is dynamically configured by the at least one network node on the second path segment.

8. A method comprising:
    assigning, by a controller, both a path-based transport protocol to a first path segment of an end-to-end path and a link-based transport protocol to a second path segment of the end-to-end path according to at least a frequency of topological updates to regions traversed by the first path segment and the second path segment, at least part of the end-to-end path pre-configured in accordance with the path-based transport protocol; and
    communicating, by the controller, at least one forward information base (FIB) control signaling instruction to at least one network node on the first path segment and at least one network node on the second path segment, the at least one FIB control signaling instruction instructing the at least one network node on the first path segment to forward a packet over the first path segment according to the path-based transport protocol and instructing the at least one network node on the second path segment to forward the packet over the second path segment according to the link-based transport protocol, wherein the path-based transport protocol requires that the packet is forwarded over the first path segment according to a path identifier in a header of the packet, and wherein the link-based transport protocol requires that the at least one network node on the second path segment dynamically select next-hops on a node-by-node basis when forwarding the packet over the second path segment.

9. The method of claim 8, wherein the path identifier is associated with a first pathway spanning the first path segment, and wherein each next-hop along a second pathway spanning the second path segment is dynamically selected by a preceding node on the second pathway.

10. The method of claim 9, wherein the first pathway is pre-configured by the controller, and wherein the second pathway is dynamically configured by the at least one network node on the second path segment.

11. The method of claim 8, wherein the path-based transport protocol is assigned to the first path segment upon determining that a forwarding information base (FIB) storage capacity of each of the at least one network node on the first path segment exceeds an upper storage threshold, and wherein the link-based transport protocol is assigned to the second path segment upon determining that an FIB storage capacity of each of the at least one network node on the second path segment is in-between a lower storage threshold and the upper storage threshold.

12. The method of claim 8, wherein the first path segment is in a first region, and the second path segment is in a second region that is different than the first region.

13. The method of claim 12, wherein the link-based transport protocol is assigned to the second path segment upon determining that a control plane signaling capacity of the second region exceeds an upper threshold, and the path-based transport protocol is assigned to the first path segment upon determining that a control plane signaling capacity of the second region is below a lower threshold.

14. A controller comprising:
a processor; and
a computer readable storage medium storing programming for execution by the processor, the programming including instructions to:
assign both a source-based transport protocol to a first path segment of an end-to-end path and a path-based transport protocol to a second path segment of the end-to-end path according to at least a frequency of topological updates to regions traversed by the first path segment and the second path segment, the end-to-end path pre-configured in accordance with the source-based transport protocol and the path-based transport protocol; and
communicate at least one forward information base (FIB) control signaling instruction to at least one network node on the first path segment and at least one network node on the second path segment, the at least one FIB control signaling instruction instructing the at least one network node on the first path segment to forward a packet over the first path segment according to the source-based transport protocol and instructing the at least one network node on the second path segment to forward the packet over the second path segment according to the path-based transport protocol, wherein the source-based transport protocol requires that the packet is forwarded over the first path segment according to a list of next-hop addresses in a header of the packet, and wherein the path-based transport protocol requires that the packet is forwarded over the second path segment according to a path identifier in the header of the packet.

15. The controller of claim 14, wherein the list of next-hop addresses define a first pathway spanning the first path segment, and wherein the path identifier is associated with a second pathway spanning the second path segment.

16. The controller of claim 15, wherein the first pathway and the second pathway are pre-configured by the controller.

17. The controller of claim 15, wherein the at least one FIB control signaling instruction instructs a first ingress network node on the first pathway to append the list of next-hop addresses to the packet, and wherein the at least one FIB control signaling instruction instructs a second ingress network node on the second pathway to append the path identifier to the packet.

18. The controller of claim 14, wherein the source-based transport protocol is assigned to the first path segment upon determining that a forwarding information base (FIB) storage capacity of each of the at least one network node on the first path segment is less than a lower threshold, and wherein the path-based transport protocol is assigned to the second path segment upon determining that an FIB storage capacity of each of the at least one network node on the second path segment exceeds an upper threshold.

19. The controller of claim 14, wherein the first path segment is in a first region, and the second path segment is in a second region that is different than the first region.

20. The controller of claim 19, wherein the source-based transport protocol is assigned to the first path segment upon determining that a control plane signaling capacity of the first region exceeds a lower threshold, and wherein the path-based transport protocol is assigned to the second path segment upon determining that a control plane signaling capacity of the second region is below the lower threshold.

21. The controller of claim 19, wherein the source-based transport protocol is assigned to the first path segment upon determining that a data plane overhead capacity of the first region exceeds a threshold; and
wherein the path-based transport protocol is assigned to the second path segment upon determining that the data plane overhead capacity of the second region is less than the threshold.

22. The method of claim 1, wherein the source-based transport protocol is assigned to the first path segment upon determining that a forwarding information base (FIB) storage capacity of each of the at least one network node on the first path segment is less than a lower threshold, and wherein the path-based transport protocol is assigned to the second path segment upon determining that an FIB storage capacity of each of the at least one network node on the second path segment exceeds an upper threshold.

23. The method of claim 1, wherein the first path segment is in a first region, and the second path segment is in a second region that is different than the first region.

24. The method of claim 23, wherein the source-based transport protocol is assigned to the first path segment upon determining that a control plane signaling capacity of the first region exceeds a lower threshold, and wherein the path-based transport protocol is assigned to the second path segment upon determining that a control plane signaling capacity of the second region is below the lower threshold.

25. The method of claim 23, wherein the source-based transport protocol is assigned to the first path segment upon determining that a data plane overhead capacity of the first region exceeds a threshold; and
  wherein the path-based transport protocol is assigned to the second path segment upon determining that the data plane overhead capacity of the second region is less than the threshold.

26. The method of claim 5, wherein the source-based transport protocol is assigned to the first path segment upon determining that a forwarding information base (FIB) storage capacity of each of the at least one network node on the first path segment is less than a lower threshold, and wherein the link-based transport protocol is assigned to the second path segment upon determining that an FIB storage capacity of each of the at least one network node on the second path segment is in-between the lower threshold and an upper threshold.

27. The method of claim 5, wherein the first path segment is in a first region, and the second path segment is in a second region that is different than the first region.

28. The method of claim 27, wherein the source-based transport protocol is assigned to the first path segment upon determining that a control plane signaling capacity of the first region exceeds a lower threshold, and wherein the link-based transport protocol is assigned to the second path segment upon determining that a control plane signaling capacity of the second region exceeds an upper threshold.

29. The method of claim 27, wherein the source-based transport protocol is assigned to the first path segment upon determining that a data plane overhead capacity of the first region exceeds a threshold; and
  wherein the link-based transport protocol is assigned to the second path segment upon determining that the data plane overhead capacity of the second region is less than the threshold.

* * * * *